Patented Sept. 1, 1953

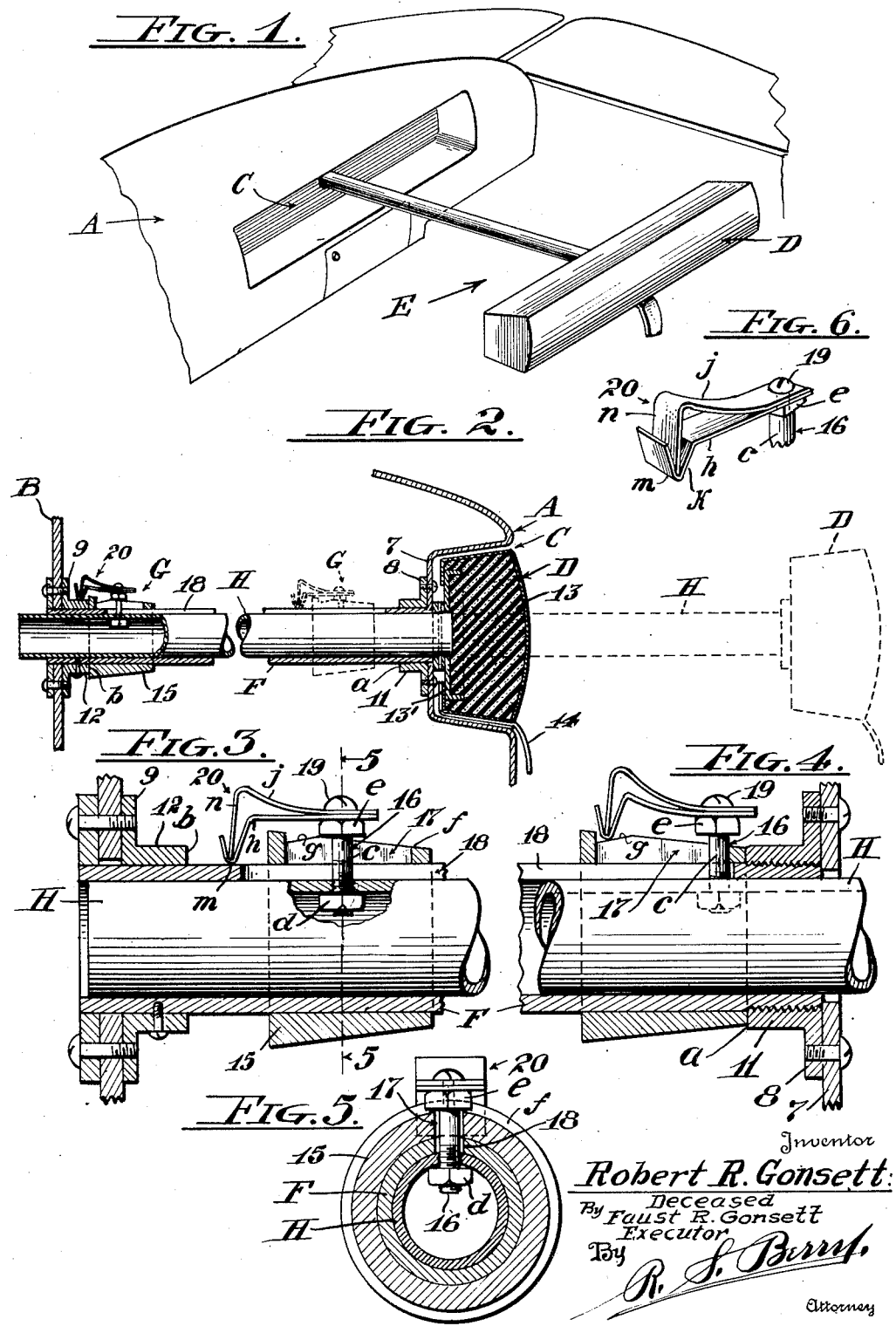

2,650,835

UNITED STATES PATENT OFFICE 2,650,835

PASSENGER PROTECTING FENDER ATTACHMENT FOR VEHICLE INSTRUMENT PANELS

Robert R. Gonsett, deceased, late of North Hollywood, Calif., by Faust R. Gonsett, executor, Burbank, Calif.

Application March 10, 1952, Serial No. 275,844

9 Claims. (Cl. 280—150)

This invention relates to fender attachments for the instruments panels of motor vehicles, and has as its primary object the provision of a fender which is adapted to be interposed between the instrument panel of a motor vehicle and the body of a person occupying the front seat of the vehicle so as to prevent excessive forward movement of the body in event of sudden slackening of speed or stopping of the vehicle when moving forwardly such as is occasioned by sudden application of the vehicle brakes and by collision.

Another object is to provide a fender of the above character which is adapted to normally be disposed in an out of the way position when not in use but which may be readily placed in and out of its operative position as required.

Another object is to provide a construction whereby the fender may be adjusted to various extended positions in front of the instrument panel to accommodate it to persons of various girth with whom the fender is to be associated when occupying the seat facing the instrument panel.

Another object is to provide a releasable grip for locking the fender against retrograde movement from any of its extended positions, but which is adapted to be neutralized to permit such movement in restoring the fender to its normal retracted position.

With the foregoing objects in view together with such other objects and advantages as may subsequently appear, the invention resides in the parts and in combination, construction and arrangement of parts hereinafter described and claimed, and as illustrated by way of example in the accompanying drawing in which:

Fig. 1 is a perspective view illustrating the invention as applied to the instrument panel of a vehicle and showing the fender in an extended position relative to the panel;

Fig. 2 is a view of the mounted fender as seen partly in section and partly in elevation and showing the fender in its retracted position in full lines and in an advanced position in dotted lines;

Fig. 3 is an enlarged detail in section and elevation of the gripping mechanism showing it in its operative position in which it acts to prevent retrograde movement of the fender yet permits advance movement thereof;

Fig. 4 is a view similar to Fig. 3 but showing the gripping mechanism in its neutral position in which the fender is permitted to be either advanced or retracted;

Fig. 5 is a view in cross section taken on the line 5—5 of Fig. 3; and

Fig. 6 is a perspective view of a spring pawl employed in the gripping mechanism.

Referring to the drawings more specifically A indicates generally the instrument panel of a motor vehicle and B designates the upright firewall of the vehicle spaced from and substantially paralleling the back of the panel A as is common in motor vehicle construction.

In carrying out the present invention in factory installation, the panel A is preferably formed with an elongated horizontally extending recess C arranged at a suitable position opposite the front seat of the vehicle, which recess is designed to receive a buffer D constituting the head portion of the fender E when the latter is in its retracted out of use position.

It will be understood, however, that in event the invention is to be installed as an accessory and in vehicles where the provision of the recess C would be inconvenient or unnecessary such recess may be dispensed with. In either event, a feature of the invention resides in the provision of an open ended guide-tube F which is mounted to extend horizontally between the panel A and the fire wall B with one end thereof opening to the front of the panel A and its other end opening through the fire wall; in this instance the tube F opening through the upright wall 7 of the recess C. The tube F is here shown as fitted with end flanges 8 and 9 rigidly affixed thereto and which in turn are securely fastened to the panel A and fire wall B; the tube F thus being fixed in place preferably in a horizontal position as shown, but which in some instances may be at an inclination to the horizontal according to requirements.

Shoulders $a$ and $b$ are provided to project from the perimeter of the tube F at points adjacent the ends thereof and contiguous the adjacent faces of the wall 7, and fire wall B respectively; the shoulders being here shown as constituting the ends of annular collars 11 and 12 formed integral with the end flanges 8 and 9. However, the shoulders $a$ and $b$ which constitute stops or abutments for a gripping device G slidably carried on the tube F may be formed on collars apart from the end flanges where need be.

Mounted in the tube F for longitudinal slidable movement is a tubular slide bar H on the outer end of which is fixedly mounted the buffer D which buffer is here shown as embodying an elongated cushion 13 carried on a back-plate 13' fixed on the bar H. The buffer may be fitted with a finger-hold strap 14 by which the buffer may be pulled from its seated position in the recess C.

The gripping device G embodies a sleeve 15 which loosely encircles the tube F for slidable movement longitudinally of the latter and is connected to the slide bar H for limited movement lengthwise thereof by a bolt 16 the shank $c$ of which passes loosely through an elongated longitudinally extending slot 17 in the sleeve 15 and through a slot 18 formed in the tube F and extending substantially throughout the length thereof between the shoulders $a$ and $b$; the bolt fixedly engaging the slide bar H by screw connection therewith and with a lock nut $d$ interially of the slide bar. The bolt 16 has a head $e$ which overlies the margins of the slot 17 in the sleeve 15 and is adapted to have releasable wedge engagement with the latter intermediate the ends thereof for which purpose the sleeve 15 is tapered longitudinally to present an inclined face $f$ to the underside of bolt head $e$.

The inclined face $f$ leads outwardly toward the fire-wall B, that is toward the rear ends of the tube F and slide bar H, and is disposed so that the outer end portion thereof will abut the bolt head $e$ in tight wedge engagement therewith on thrusting the slide bar H rearwardly from an advanced position so that the bolt 16 will move along the slot 17 in the sleeve 15 until engagement of the head $e$ with the face $f$ is effected.

Attached to the upper face of the head $e$ of the bolt 16 by a clamping screw 19 is a spring pawl 20 which overlies the sleeve 15 and has an inturned free outer end portion adapted to be disposed either in abutting engagement with the tube F or in a seated position in a notch $g$ formed on the sleeve 15 at the outer end of the inclined face $f$, according to whether the sleeve 15 is positioned with the face $f$ engaging the bolt head $e$ as shown in Fig. 3 or is positioned free of the bolt head as shown in Fig. 4.

The spring pawl 20 embodies a pair of superimposed plate springs comprising an inner spring member $h$ and an outer spring member $j$, the inner end portions of which are clamped in abutting relation on the bolt head $e$ by the screw 19. The outer free end portion of the inner spring member $h$ is formed with a V-bend $k$ the apex $m$ of which seats either on the tube F or on the sleeve 15 according to the relative position of the latter. The outer free end portion of the outer spring member $j$ is formed with an inwardly extending leg $n$ the free end of which is seated in the crotch of the V-bend $k$ of the spring member $h$. The spring members $h$ and $j$ are tensioned to exert an inward thrust toward the tube F and to oppose outward movement of the free ends thereof. By this construction of the spring pawl 20 the outer end thereof when pulled will slide on the surface contacted thereby but when pushed longitudinally while contacting tube F will effect frictional wedge engagement with the latter so as to then inhibit retraction of the slide bar H.

The sleeve 15 is so positioned relative to the slide-bar H that when the latter is disposed in its retracted position with the buffer D in its innermost position, the outer end of the sleeve 15 will abut the shoulder $b$ with the sleeve 15 retracted on the tube F as shown in Fig. 2 so that the inclined face $f$ will be engaged with the head $e$ of the bolt 16. When the sleeve 15 is thus positioned, the outer end of the spring pawl 20 will seat on the collar 12.

In the operation of the invention the fender E is placed in its advanced operative position by pulling the buffer D outward away from the instrument panel A as by means of the strap 14 to dispose the buffer D adjacent the body of a person occupying a seat facing the panel A which operation advances the slide bar H in the guide tube F. The sleeve 15 and the spring pawl 20 are carried forward with the slide bar by reason of the then wedge engagement of the face $f$ of the sleeve 15 with the head $e$ of the bolt 16; the pawl 20 passing from the collar 12 into abutting engagement with the tube F as shown in Fig. 3 and as indicated in dotted lines in Fig. 2 where the pawl acts to grip and hold the slide bar against retrograde movement yet permitting advance thereof relative to the guide tube F to any desired advanced position within the range of its movement. The buffer D will thus be disposed so as to act as a barrier to prevent excessive forward movement of the body of the person in front of which the buffer is arranged.

When it is desired to release the pawl 20 from engagement with the tube F, the slide bar $f$ is moved to its fully advanced position in a manner such as to cause the reduced end of the sleeve 15 to impact against the shoulder $a$ and come to rest thereagainst with sufficient jar to effect disengagement of the bolt head $e$ from the inclined face $f$. The bolt 16 will then advance in the slot 17 of the sleeve 15 and will carry the pawl 20 therewith. This action will cause the outer end of the pawl to ride over the enlarged end of the sleeve 15 into a seated position in the notch $g$ on the latter as shown in Fig. 4. When the parts are thus positioned the sleeve 15 is engaged by the pawl and the latter is free of the tube F so that on retracting the slide bar H the sleeve 15 will move therewith. This retrograde movement of the slide bar is continued until the forward end of the sleeve 15 is impacted against the shoulder $b$ to bring the sleeve 15 to rest whereupon further rearward movement of the slide bar is effected to cause the bolt 16 and spring pawl 20 to advance relative to the sleeve 15 so as to disengage the outer end of the pawl 20 from the notch $g$ and reseat it on the collar 12. The parts will then be restored to their normal position in readiness for another operation.

It will be observed that by reason of the bolt 16 extending through the slot 18 of the guide tube F the slide bar H will be held against turning in the latter so that the elongated buffer D will be maintained in a horizontally extended position.

While a specific construction has been herein described the invention is not limited thereto and changes may be made therein within the meaning of the appended claims.

What is claimed is:

1. In a fender attachment for the instrument panel of a motor vehicle, a guide tube formed with a longitudinally extending slot, a slide bar mounted for reciprocal movement in said tube, a buffer on one end of said slide bar, a sleeve loosely encircling said guide tube for sliding movement lengthwise thereof, said sleeve being formed with a longitudinal slot and having an inclined face extending along said slot, a bolt affixed to said slide bar and extending through the slots in said sleeve and tube, a head on said bolt, arranged to have releasable wedge engagement with said inclined face, a spring pawl carried by said bolt having an outer end adapted to frictionally engage said guide tube and also adapted to be seated on said sleeve, and spaced shoulders on said guide tube against which the ends of said sleeve are abuttable on advancing and retracting said slide bar to shift said sleeve relative to said spring pawl to place it in and out of operative relation to said guide tube.

2. In a fender attachment for the instrument panel of a vehicle embodying a buffer supporting slide bar, and a guide tube in which the slide bar is mounted for longitudinal reciprocal movement; a sleeve on said guide tube slidable lengthwise thereof, said sleeve and guide tube being formed with longitudinal slots, a bolt fixed on said slide bar extending freely through said slots, a spring pawl carried by said bolt having an outer free end portion extending toward said tube and adapted to be disposed in gripping engagement therewith to hold the slide bar against movement in one direction lengthwise of the guide tube, a shoulder adjacent one end of the guide tube against which one end of the sleeve is abuttable to hold the sleeve stationary relative to said slide bar whereby outward movement of the slide bar will then advance the spring pawl to a position with its free end portion supported on said sleeve out of contact with said tube and thereby permit free longitudinal movement of the slide bar relative to the guide tube in either direction, and a shoulder adjacent the other end of said guide tube against which the other end of the sleeve is abuttable to hold the sleeve stationary relative to said slide bar whereby inward movement of the slide bar will move the spring pawl to a position with its free end portion disposed clear of said sleeve for engagement with said guide tube to hold the slide bar against retrograde movement relative to the guide tube when the pawl engages the latter.

3. In a fender attachment for the instrument panel of a vehicle, a guide tube formed with a longitudinal extending slot, a slide bar mounted for reciprocal movement in said tube, a buffer on one end of said slide bar, a sleeve loosely encircling said guide tube for sliding movement lengthwise thereof, said sleeve being formed with a longitudinal slot and having an inclined face extending along said slot, a bolt affixed to said slide bar and extending through the slots in said sleeve and tube, a head on said bolt arranged to have releasable wedge engagement with said inclined face, a spring pawl carried by said bolt having an outer end adapted to frictionally engage said guide tube and also adapted to be seated on and engaged by said sleeve, and stop means on said tube engageable with said sleeve on reciprocation of said slide bar holding said sleeve stationary relative to the slide bar adjacent the ends of its stroke; said spring being movable with said slide bar in and out of a seated position on said sleeve.

4. In a fender attachment for the instrument panel of a vehicle, a slide bar, a guide tube in which said bar is mounted for longitudinal movement, a buffer on one end of said bar, a sleeve slidably encompassing said tube, said tube and sleeve having longitudinal slots, a bolt extending through said slots connected to said bar, a spring pawl on said bolt having an end portion frictionally engageable with said tube, means for disposing said end portion on said sleeve out of engagement with said sleeve, and means for moving said end portion off said sleeve for engagement with said tube.

5. In a fender attachment for the instrument panel of a vehicle including a slide bar, a guide tube in which said bar is mounted for longitudinal reciprocal movement, and a buffer on one end of said bar; a spring pawl having an outer end portion overlying said guide tube, means carried by said slide bar supporting said pawl, a sleeve on said guide tube having limited longitudinal movement relative thereto between the pawl and tube, and means for shifting said sleeve relative to said guide tube to move it in and out of a position between the outer end portion of said pawl and said tube to dispose said pawl in and out of engagement with said tube.

6. In a fender attachment for the instrument panel of a vehicle including a slide bar, a guide tube in which said bar is mounted for longitudinal reciprocal movement, and a buffer on one end of said bar; a spring pawl having an outer end portion overlying said guide tube, means carried by said slide bar supporting said pawl, a sleeve on said guide tube having limited longitudinal movement relative thereto between said pawl and tube, and means for shifting said sleeve relative to said guide tube to move it in and out of a position between the outer end portion of said pawl and said tube to dispose said pawl in and out of engagement with said tube, said last named means including spaced shoulders on said tube against which the ends of the sleeve are abuttable to hold the sleeve fixed relative to said slide bar adjacent the ends of the stroke thereof.

7. In a fender attachment for the instrument panel of a vehicle, a bumper supporting slide bar, a guide tube in which said bar is reciprocally mounted, a spring pawl attached to said slide bar having an outer end portion toward said guide tube, and means controlled by movement of said slide bar for disposing said pawl in and out of engagement with said guide tube embodying a sleeve on said guide tube, and means for shifting said sleeve longitudinally of said tube and slide bar to dispose it in and out of a position interposed between the outer end portion of the pawl and said tube.

8. In a fender attachment for the instrument panel of a vehicle, a buffer carrying slide bar, a guide tube in which the bar is mounted for longitudinal reciprocal movement, a sleeve on said tube, said sleeve and tube being formed with slots extending lengthwise thereof, a bolt affixed to said slide bar and extending through said slots and relative to which said sleeve is movable longitudinally relative to said tube and slide bar, a spring pawl carried by said bolt having a free outer end portion presented toward said guide tube and adapted to grip the latter to hold the slide bar against inward movement relative to the guide tube, a stop for limiting movement of the sleeve in one direction whereby outward movement of the slide bar will dispose the free end of the spring pawl in a seated position on said sleeve out of engagement with said guide tube, and means for engaging the other end of said sleeve to hold it against movement relative to the guide tube and slide bar adjacent the end of the retrograde stroke of the latter whereby inward movement of the slide bar at the end portion of its retrograde stroke will move said spring pawl out of engagement with said sleeve.

9. The structure called for in claim 8 together with wedge means for releasably engaging said bolt and sleeve when said pawl is disengaged from said sleeve.

FAUST R. GONSETT,
*Executor of the estate of Robert R. Gonsett, deceased.*

References Cited in the file of this patent

UNITED STATES PATENTS

| Number | Name | Date |
|---|---|---|
| 1,748,426 | Pentland | Feb. 25, 1930 |
| 2,322,755 | Voorhies | June 29, 1943 |
| 2,557,365 | Weber | June 19, 1951 |

FOREIGN PATENTS

| Number | Country | Date |
|---|---|---|
| 825,932 | France | Dec. 27, 1937 |